June 11, 1963 J. L. MURPHY 3,093,742

EXTENDED RADIATION MICROMETER GAGE

Filed March 17, 1961

INVENTOR.
JAMES L. MURPHY
BY
Robert ... 
ATTORNEY 3,093,742

EXTENDED RADIATION MICROMETER GAGE

James L. Murphy, Old Greenwich, Conn., assignor to Barnes Engineering Company, Stamford, Conn., a corporation of Delaware Filed Mar. 17, 1961, Ser. No. 96,560
4 Claims. (Cl. 250—220)

This invention relates to a continuous gage for measuring or monitoring the width of moving bodies such as hot metal strips, wires, rods, extruded glass tubing and the like.

In the past a number of gages have been devised using radiant energy from the moving material. Depending on the temperature of the material the radiant energy may be in the visible, near, or far infrared. A rather cumbersome and slow responding gage is shown in the Beelitz Patent 2,921,917 in which two radiation detectors in the form of phototubes are mounted on a right and left hand thread screw and when the screw is rotated they move in opposite directions across a moving strip of steel. The instrument is designed so that when the photocells see the edges of the strip the screw is not driven. If the two phototubes both see strips, as in the case of a strip that is too wide, the signals cause the screw to be driven to move them further apart and similarly with a strip that is too narrow where the phototubes are beyond the edges, the signals reverse the drive. There is also provided another screw which moves a framework containing both photocells and drive if the strip as a whole moves from side to side. The device is operative if a movement of the strip or changes in its dimensions are sufficiently slow but is at the mercy of changes in temperature of the strip and also its precision and speed of response is limited by the response of the relatively slow mechanical drive.

A more accurate and practically instantly responsive gage is described and claimed in the patent of Robert W. Astheimer, No. 3,003,064, October 3, 1961. In this device a single radiation detector is scanned across the moving material, the scanning being effected by suitable reticles and an aperture window. The simple associated electronic circuits measure the width of the pulses between the crossing of one edge of the strip and the crossing of the other. The circuits involve clipping so that only the width of the square waves produced is measured, amplitude being kept constant by clipping so that there is no change in the response with changing temperature of the material. The response is so rapid as to be almost instantaneous compared to the slow response of the mechanically driven device in the Beelitz patent and the accuracy is as high as can be obtained within the limits of detector response and other characteristics.

Despite the great improvement in accuracy an extremely fast response to variation in width of the material, as it moves past the Astheimer gage, has a limit of accuracy just as do all instruments which measure a signal by scanning across a self-luminous material with sharp radiation discontinuities at the edges. In common with other radiation scanning instruments the accuracies are percentages of the length of the scan across the radiating material. With relatively narrow material such as hot wires, rods, tubes and the like the scan length is relatively short and the accuracy is extremely high, 0.001″ or better. However, when a wide strip is to be gaged, for instance a strip of hot steel, the absolute accuracy is reduced as it is determined by a fixed accuracy percentage of the total width of the strip.

For many uses in steel mills the accuracy of the Astheimer gage is entirely adequate and its ruggedness, reliability and relatively low cost makes it very desirable.

For very wide strips under certain circumstances increased precision is desired. The present invention deals with scanning gages of increased precision. It will be described in conjunction with a highly efficient Astheimer gage though this particular scanning gage does not form any part of the invention and other scanning gages may be employed.

Essentially the present invention splits the scan into two scans over a very narrow distance at each edge of the moving strip. The center part is not scanned at all but the distance between the inner edges of the two scans is known with great precision. The scans measure the width of the relatively narrow strips adjacent to each edge. The accuracy is extremely high because the total scan length is quite small and as the unscanned center portion of the strip does not change its precise dimensions can be added to the scanned dimensions of the two strips without any loss of accuracy.

Theoretically the present invention will maintain its accuracy regardless of the width of the strip and is capable of maintaining the high accuracy even with strips of widths far beyond anything encountered in any practical operation. Theoretically a strip 100 feet wide can be measured with just as much precision as one 3′ or 4′ wide. This almost complete elimination of the falling off of accuracy with strip width is the new result obtained by the present invention. In practice, of course, instruments will not be needed for strip widths beyond 5′ or 6′ and such instruments are lighter and much cheaper than instruments capable of measuring strips of enormous widths. However, the invention is in no sense limited to the measurement of strips of any particular range of widths so long as the strip is wider than the two narrow scans at its edges.

The invention will be described in greater detail in conjunction with the drawings in which.

Figure 2:
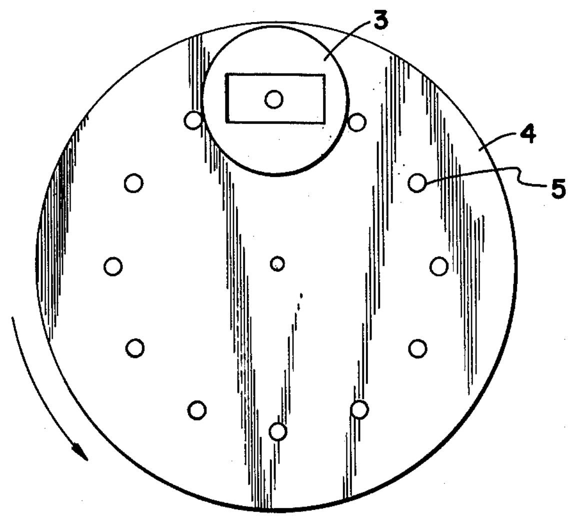
FIG. 2 is an elevation of the reticle and mask.
Figure 1:
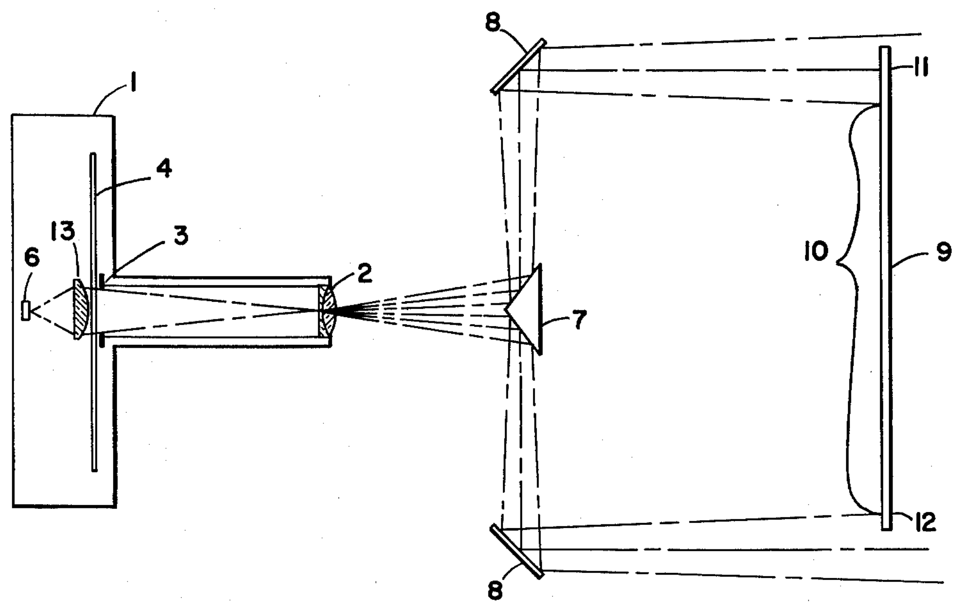
FIG. 1 is a section through a gage and a moving strip of material.

FIG. 1 shows in semidiagrammatic form an Astheimer gage and a moving strip of hot steel. The gage is contained in a housing 1 provided with an objective 2, a mask 3, a reticle 4 with a series of apertures 5 and a radiation detector 6. The gage is optically centered on a double mirror 7 which receives radiation from the edges of a strip 9 by means of two mirrors 8. The mirrors 7 and 8 and the gage itself are shown arranged diagrammatically as they do not have to be in a single instrument. All that is necessary is that the gage be properly aimed and that the optical paths be of suitable length to determine the scanning angle at the strip.

The strip 9 consists of a central portion 10 between the inner edges of the two scanned in strips 11 and 12. So long as the strip does not move so that one edge is entirely outside of one of the scan angles it makes no difference whether the strip is centered or not, and this is shown in the drawing with the edge 11 extending further into its scan than does the edge 12. Normally, of course, the strip is more or less centered but as it may weave somewhat during rolling the edges may not be uniformly scanned. It is a great advantage of the present invention that this in no wise affects the accuracy. The central portion 10 of the strip is of dimensions which are accurately known. The distance between the inner edges of the scans can be measured initially with great precision and it does not change.

The scanning operation will become apparent by considering the scans starting at the outer edge of one scan. At this point no hot strip is seen and the detector does not put out any signal. As the scan swings inward the scan shown in the upper part of FIG. 1 strikes the edge of the portion 11 of the moving strip. The detector sees hot strip and a pulse is started. As the scan continues it scans across the strip 11 and then suddenly jumps to the other mirror and scans out across the strip 12. Finally when it reaches the edge the signal ceases. Another hole in the reticle 4 then starts going past the window 3 and a second scan starts.

As has been pointed out above the simple electronics of the Astheimer gage measure only pulse width, that is to say the duration during which the detector sees the hot strip. As the reticle is rotated at uniform speed by the conventional synchronous motor (not shown), pulse width is proportional to the width of the strip edges seen. In other words, the signal is proportional to the total length of the two edge strips 11 and 12. The dimensions of the central unscanned portion 10 of the whole strip do not change and so the measure of the edge portions 11 and 12 when added to these known dimensions gives the total width of the strip. It should be noted that the accuracy with which the gage measures the widths of edge portions 11 and 12 is determined by the scanning angle. This is quite small in comparison with the central portion 10 of the strip and so the edge portions can be measured with great accuracy. Let us assume that the instrumental accuracy is one part in 5,000 and the total scan width of each edge portion is 5″. This means that the measurement of the width of the portions 11 and 12 will be accurate to a thousandth of an inch. Let it be further assumed that the measured length of the two strips 11 and 12 is 3″. Now if the central part 10 of the strip is 32″ a strip 35″ wide is being measured to the accuracy of a thousandth of an inch. No assume that an ordinary measurement was made with a scan going across the whole width of the strip and assume the instrumental accuracy to be as before. The measurement now will be accurate only to $\frac{35}{5,000}$ of an inch. In other words the present invention increases the accuracy seven times.

Radiation detectors, particularly detectors in the infrared, have a finite surface, and sometimes the surface is not completely uniform in sensitivity. Any errors due to nonuniformity are removed by the field lens 13 which images the entrance pupil of the gage (in the drawing determined by the aperture of the objective 2), onto the whole of the surface of the detector. Therefore, as the successive apertures 5 of the reticle move past the window and so scan across the edges of the edge strips the radiation passing through is at all times distributed over the whole of the detector surface and nonuniformity of detector sensitivity is eliminated. The use of a field lens in a gage such as the Astheimer gage is not new as an optical element. It is only mentioned here in connection with the illustration which deals with a highly precise scanning gage.

The particular type of scanning gage which is used in conjunction with the split scans at the edges of the strip with an unscanned center portion forms no part of the present invention. The Astheimer gage has been illustrated as a typical scanning gage representing the best modern practice for the scanning of this type of material. Any other scanning gage can be substituted but, of course, the final accuracy will be determined by the gage itself. However, regardless of whether the accuracy is relatively high or low the present invention increases the accuracy for a wide strip. It is an advantage of the present invention that it does not require the use of a particular type of gaging mechanism.

The splitting of the scan path has been illustrated as effected by the double mirror 7 and the single mirrors 8. These are front surface mirrors. They are cheap to construct and as there is ample radiating energy from the hot strip any small loss of efficiency due to dust on the surfaces is relatively unimportant so long, however, as the reflectivity of the mirrors remains the same, particularly the mirrors 8. If there is a big difference in reflectivity between the mirrors then there may be a second order error when the strip is not exactly centered. However, the clipping of the electronic circuits in the gage is so effective that the accuracy does not suffer seriously. Where the absolute limit in accuracy is desired the mirrors may be totally reflecting prisms. The reflectivity at the prism-air interface remains 100% regardless of accumulation of dust on the surface. Ordinarily the front surface mirrors shown in the drawing are adequate. However, the invention is in no sense limited to this particular conventional design of reflecting element and any suitable type may be used. It is also not necessary that all of the reflecting elements be of the same type. Some of them may be front surface mirrors and some internal reflectors.

The invention has been described in conjunction with the measurement of relatively hot objects such as hot steel strips. If these strips are hot enough to emit in the visible or very near infrared phototubes or photoconductors may be used. Their extremely short time constants permits scanning at any repetition rate reasonably desired. If the temperature of the wide body to be gaged or monitored is lower emission may only be in the longer infrared. In such a case the present invention is still useful but, of course, the detector must be one which responds to the band of optical radiations in question.

It is not even necessary that the moving strip be hotter than its background. It is only necessary that there be a substantial difference so that there is a sharp radiation discontinuity at the edges of the strip. It is thus possible to use the invention to gage a cold strip against a hotter background. All that is necessary is to reverse the polarity of indicating means or electronic circuits. It is a rare occasion when a strip of very cold material would be monitored and this point is only brought out to show the great flexibility of the present invention.

It has been stated above that the present invention is not concerned with the detailed construction or design of electronic processing circuits and/or indicating or recording means. This may be thought of in another way that the present invention ceases when the correct signals have been produced by the radiation detector.

I claim:

1. An extended range, transverse dimensional gage operating on optical radiations comprising in combination and in optical alignment, (*a*) two reflecting means spaced on a line in a plane parallel to the object to be gaged, the line being transverse thereof and the spacing being such that the reflecting means have centers approximating the edges of the object to be gaged and incline to reflect optical radiations from the object inwardly at an angle, (*b*) unitary reflecting means receiving the radiations reflected from the first means and positioned centrally to combine the reflections onto a single beam, (*c*) a scanning radiometric gage positioned in said combined beam and provided with a radiation detector capable of transforming radiation signals onto electrical signals, (*d*) said radiometric gage being positioned to scan successive portions of the combined beam onto the detector and (*e*) the inner limits of the first reflecting means being spaced a considerable distance from the center of the object to be gaged whereby the radiometric gage scans across a narrow beam at each edge of the object to be gaged.

2. An instrument according to claim 1 in which the first reflecting means are front surface mirrors.

3. An instrument according to claim 2 in which the second reflecting means are two mirror surfaces meeting along a sharp central line.

4. An instrument according to claim 1 in which the radiometric scanning gage is provided with a stationary radiation detector and scanning means moving successive portions of the combined beam across the detector.

References Cited in the file of this patent

UNITED STATES PATENTS

| | | |
|---|---|---|
| 2,547,212 | Jamison et al. | Apr. 3, 1951 |
| 2,548,590 | Cook | Apr. 10, 1951 |
| 2,674,917 | Summerhayes | Apr. 13, 1954 |
| 2,868,059 | Summerhayes | Jan. 13, 1959 |
| 2,937,283 | Oliver | May 17, 1960 |
| 2,969,707 | Hansen | Jan. 31, 1961 |
| 3,003,064 | Astheimer et al. | Oct. 3, 1961 |
| 3,055,263 | Kuehne | Sept. 25, 1962 |